Nov. 28, 1967 W. A. FORDECK ET AL 3,355,131

HOLD-DOWN FOR RECORD CHANGER

Filed Feb. 1, 1966

INVENTORS.
WILLIAM A. FORDECK &
BY CARL R. HART

Lockwood, Woodard, Smith & Weikart
ATTORNEYS 3,355,131

HOLD-DOWN FOR RECORD CHANGER

William A. Fordeck, Garrett, and Carl R. Hart, New Haven, Ind., assignors to The Magnavox Company, Fort Wayne, Ind., a corporation of Delaware Filed Feb. 1, 1966, Ser. No. 524,322
4 Claims. (Cl. 248—20)

ABSTRACT OF THE DISCLOSURE

A combination suspension and clamp assembly for a record changer base plate, including a mounting cup secured in a cabinet and receiving a suspension spring therein supporting a screw threadedly received in a record changer base plate for resiliently supporting the record changer on the cabinet. A knob on the screw and having a left-hand thread thereon engageable with the bottom of the cup without moving upwardly therethrough upon counter-clockwise turning of the screw in the changer base plate, whereupon the base plate is pulled down to a position tightly clamped to the cup by the screw because of the right-hand threads in the changer base plate. A left-hand thread form in the bottom of the cup enabling passage of the knob and screw upwardly through the cup upon right-hand rotation of the screw to permit removal of the changer assembly from the cabinet.

*Background of the invention*

This invention relates generally to phonographs, and more particularly to a device serving as a normal spring suspension component for the record player-changer in the cabinet during normal use of the phonograph, and serving also as a hold-down for the changer for use during shipment or moving of the phonograph.

It is common practice to affix the record changer mounting plate to the cabinet structure in a phonograph prior to shipment, to avoid damage. This is usually done with clips, clamps, or other devices, some of which require removal of part of the cabinet to release them, after shipment, to prepare the phonograph for use. Other hold-down devices are, at best, difficult or inconvenient to install or activate prior to shipment, and remove or deactivate subsequent to shipment and prior to use of the phonograph.

It is therefore a general object of the present invention to provide a hold-down device which is easily activated, or de-activated, when desired.

A further object is to provide a device facilitating easy removal of a record changer from the cabinet, without disassembling or opening part of the cabinet.

A further object is to provide a device achieving the foregoing objects and requiring only access to the topside of the changer for activating and de-activating the hold-down, and for enabling the removal of the record changer from the cabinet.

A further object is to provide record player-changer suspension means which are easily installed from above the cabinet.

*Summary*

Described briefly, a typical embodiment of the present invention employs a screw having right-hand threads thereon and left-hand threads thereon, the right-hand threads being threadedly received in the record changer base or mounting plate. This screw is resiliently supported by a left-hand threaded member secured to the cabinet, whereby the record changer base plate is resiliently supported in spaced relation to and above the changer supporting board in the cabinet.

The left-hand thread on the screw is disposed to remain normally out of engagement during the resilient suspension and use of the record player, but is engageable with the threaded member on the support board when the screw is threaded upwardly in the record player mounting plate, to pull the mounting plate down into an affixed condition with respect to the mounting board affixed in the cabinet. The screw is accessible from above the changer so it is not necessary during either installation of the changer or during the fastening down thereof, to approach the changer from any direction other than above it.

The full nature of the invention will be understood from the accompanying drawings and the following description and claims.

Figure 1:
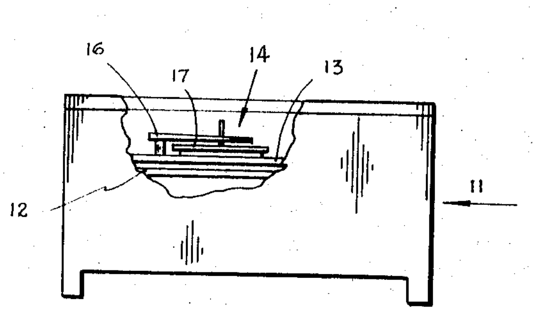
FIGURE 1 represents a phonograph, with a portion broken away to show the record player-changer therein.

Referring now to the drawings in detail, the phonograph 11 includes a cabinet having a horizontal support board 12 to which the mounting or base plate 13 of the record player-changer 14 is mounted. The player includes the usual tone arm 16, turntable 17 and spindle 18, for example. Other details are omitted, as they are not essential to the understanding of the present invention.

Figure 2:
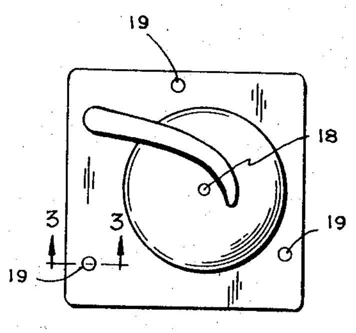
FIGURE 2 is a fragmentary schematic top plan view of the record player-changer of FIGURE 1.

As shown in FIGURE 2, there are three points 19 at which the player-changer is supported in the cabinet, and a spring suspension is typically provided at this point to maintain a floating, spaced relationship, between the player base plate 13 and the support board 12.

Various arrangements have been used in the past to provide a rigid connection between the plate 13 and board 12 for protection of the assembly during shipment.

Figure 3:
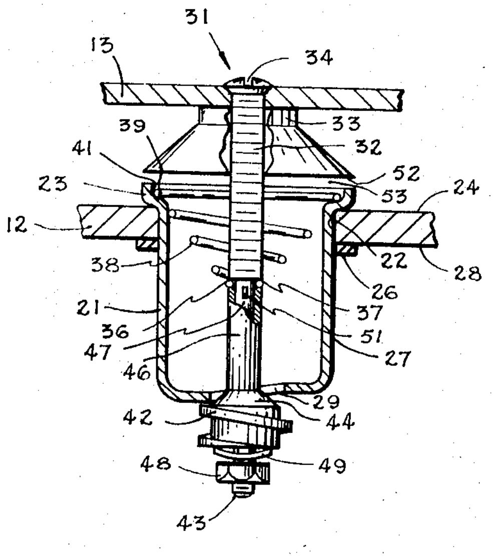
FIGURE 3 is an enlarged section therethrough taken along the line 3—3 in FIGURE 2 and viewed in the direction of the arrows, and illustrating a typical embodiment of the present invention.

According to the present invention, in a typical embodiment thereof, there is provided at each of the points 19 of FIGURE 2, a device as shown in FIGURE 3. This includes an upwardly opening cylindrical metal cup 21 fittingly received in a circular aperture 22 in the board 12, the cup having an outwardly and upwardly turned flange 23 resting on the upper face 24 of the board 12. The cup is affixed in this position by a retainer ring 26 which is pushed on the outer surface 27 of the cup and pushed up into engagement with the lower face 28 of the board 12. A suitable ring for this purpose would be the number 5115–75 ring furnished by Waldes Kohinoor, Inc. This cup 21 is provided with a formed left-hand threaded aperture 29 centrally located in the lower end thereof.

A screw or bolt 31 is provided with a right-hand thread 32 thereon which is threadedly received in the mounting plate 13 by threads provided directly in the plate 13 itself or by threads in a spacer 33 affixed to the plate. A screw driver slot 34 is provided in the upper end of the screw and by turning the screw clockwise, as viewed from above, it can be located in the position shown where the rounded upper end thereof is nearly flush or blends well with the upper face of the plate 13.

The screw thread 32 extends down on the bolt to an inward step in the diameter thereof which provides a downwardly facing shoulder 36. This shoulder is encircled by and supported on the bottom turn 37 of a conically shaped coil spring 38 which diverges upwardly therefrom to an upper turn 39 resting on and supported by the upper face 41 of the flange 23. In this way, the bolt 31 resiliently supports the record changer above the cabinet board 12.

A left-hand thread 42 is provided near the lower end 43 of the bolt 31 and, in the illustrated embodiment, this is done by providing a knob 44 at the lower end of a sleeve 46 received on the stem 47 of the bolt which extends downwardly from the shoulder 36. This sleeve is affixed to the stem and, therefore to the bolt, by a nut 48 threadedly received on the lower end of the stem, and above which a spring washer 49 can be provided, if desired. A spline or key 51 and mating slot, on the stem and sleeve, respectively, can be provided to assure that no rotation of the knob 44 with respect to the stem, can occur. Otherwise, the nut 48 can be tightened sufficiently to assure that there is no relative rotation between the knob 44 and the bolt 31. The purpose of this is to assure that the knob, and therefore the left-hand screw thread 42 thereon, is rotated at the same time and in unison with the rotation of the screw or bolt 31 from above the plate 13 by a screw driver or other suitable tool.

The spacer 33 is provided with an outwardly flared skirt thereon, the lower face or edge 52 of which is engageable with the top of the cup 21 if the plate 13 is forced downwardly. This downward force can be applied by turning the bolt 31, in a manner which will now be described.

*Operation*

From the foregoing description, it can be appreciated that if the space 53 between the lower edge 52 of the spacer and the upper edge or top of the cup is not excessive, rotation of the bolt 31 in a counterclockwise direction (as viewed from above) will move the bolt upwardly through the plate 13 and, since it is the bolt that supports the plate, the plate moves closer to the board 12. Eventually the spacer will come to rest on top of the cup, whereupon the knob 44 will begin to rise toward the lower end of the cup. When the knob thread engages the cup, it cannot move up through the cup because it is left-handed and the bolt is being turned counter-clockwise. Therefore further counter-clockwise rotation of the bolt will pull the spacer down tightly on the cup and affix the plate 13 with respect to the board 12.

Upon completion of the above procedure, the phonograph is ready for shipment or moving, without any hazard of damage. To make the phonograph ready for use, it is only necessary to reverse the procedure, namely to turn the bolt clockwise. Continued clockwise turning of the bolt down until it again engages the spring will reinstate the spring suspension of the plate 13.

If it is desired to remove the player from the cabinet, it is only necessary to lift the player plate 13 from its normal resiliently suspended position, thereby placing the thread 42 into engagement with the thread in the cup, turn the bolt clockwise enough to permit passage of the thread 42 up through the cup aperture and then merely lift the changer away.

In addition to providing a very desirable way of both suspending the changer properly for use, and holding it down properly for shipment, the present invention provides for ease of assembly and manufacture. To do this, three cups are installed on the mounting board and secured in place by their retainer ring. When a changer is ready for mounting, with the bolts screwed all the way down into the plate 13 (as in FIGURE 3) the springs are slid onto the bolts, the bolt knobs and sleeves are slid onto the bolts and secured. Then the changer is positioned by dropping the bolts into the bottoms of the cups of the mounting board. Each bolt is turned briefly counterclockwise (one turn for example) until it drops through the threaded section of the cup. The drop of the bolt will be halted by the suspension spring. Then the bolt is turned clockwise briefly until it is again all the way down into the plate (as in FIGURE 3) and, when this is done for all three bolts, the phonograph is ready for use. Then, by turning the bolt counterclockwise, as described above, the phonograph is made ready for shipment.

At this point, it may occur to the reader that if the space 53 is too small, or if there are too many threads 29 in the bottom of the cup 21, or if the lead of the screw thread 32 is too large compared to the lead of the thread 42, it will be impossible to cause the bolt knob to drop through the threaded section of the cup. Instead, the counterclockwise rotation of the bolt will pull the spacer 52 down solidly on top of the cup, thus clamping the changer as described above. Therefore, in the selection of dimensions for the components, if the space 53 is not very high and there is more than one thread in the bottom of the cup, it will likely be necessary to make the lead of the right-hand thread 32 somewhat less than that of the left-hand thread 42. If it is desirable to make the lead of both threads the same, then the number of turns in the cup must be minimized or the height of the free space 53 must be adequate to prevent the unintentional lock down during installation of the changer in the cabinet.

Figure 4:
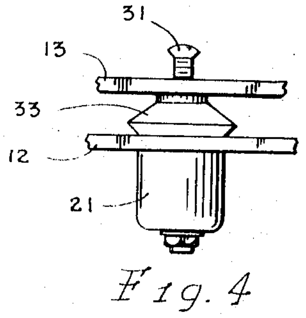
FIGURE 4 is an elevational view of the combination of FIGURE 3 (on a smaller scale), but omitting the interior details and showing the device affixing the changer plate with respect to the changer support board in the cabinet.
Figure 5:
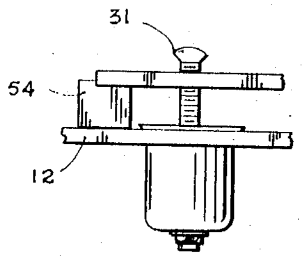
FIGURE 5 is a view like FIGURE 4, but illustrating an alternative embodiment of the invention.

While FIGURE 4 shows the condition of the parts when the bolt 31 has been backed out of the plate 13 to force the spacer 33 against the cup and thus clamp the parts together for shipment, FIGURE 5 shows an embodiment wherein the spacer 33 is omitted. In this embodiment, a block 54 of wood or other material of suitable height is disposed between the plate 13 and the support board 12. This serves the same purpose as the spacer 33 in FIGURE 4 in that it stops the downward motion of the plate 13 while the bolt 31 is turned counterclockwise and moves upwardly with respect to the plate. It thus enables further counterclockwise turning of bolt 31 to effect the clamping action described above with reference to the embodiment incorporating the spacer 33.

Figure 6:
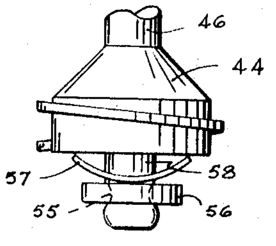
FIGURE 6 is a fragmentary view (greatly enlarged) illustrating an alternative structure for mounting the left-hand thread on the hold-down bolt.

FIGURE 6 shows an alternative arrangement for holding the left-hand threaded knob 44 on the bolt stem. In this embodiment, a circular groove 55 is provided in the lower end of the stem and receives a push-on nut 56 of good spring material which, together with the spring washer 57 forces the upper end of the sleeve 46 into engagement with the downwardly facing shoulder 36 of the bolt, thus securing the knob on the bolt.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. The combination comprising:

a support member having upper and lower faces;

a mounting member disposed above said support member;

first connector means connecting said mounting member to said support member and normally supporting said mounting member in spaced relation to said support member;

a fastener in said connector means accessible from above said mounting member, said fastener having a right-hand thread thereon threadedly received in said mounting member, and said fastener having a left-hand thread thereon threadedly receivable by a portion of said connector means affixed to said support member;

said fastener being operable from above said mounting member to affix said mounting member to said support member.

2. The combination comprising:

a support member having upper and lower faces;

a mounting member disposed above said support member;

first connector means connecting said mounting member to said support member and normally supporting said mounting member in spaced relation to said support member;

said connector means having a fastener therein accessible from above said mounting member, said fastener being operable from above said mounting member to affix said mounting member to said support member;

said connector means including a connector member affixed to said support member and having a left-hand threaded aperture therein;

said mounting member having a right-hand threaded aperture therein;

said connector means including a spring supported by said support member;

said fastener being resiliently supported on said spring, and said fastener having a right-hand thread thereon whereby said mounting member is normally resiliently supported by said support member, said fastener having a left-hand thread thereon disposed below the said threaded aperture in said connector means, said fastener having sufficient right-hand thread thereon and the clearance between said support member and mounting member during resilient support of said mounting member being such as to enable, by turning said fastener, lowering said mounting member into abutting engagement with said support member and subsequent raising of said left-hand thread into engagement with the left-hand thread of said aperture by turning said fastener in a counter-clockwise direction threading it upwardly in said mounting member, the length of said right-hand thread on said fastener being sufficient to tighten said mounting member down onto said support member upon further counter-clockwise rotation of said fastener during engagement of the left-hand thread thereon with the said aperture, 3. The combination of claim 2 wherein:

said connector member is an upwardly opening cup fittingly received in an aperture in said support member and having an outwardly turned flange resting on said upper face of said support member, said cup being secured in said aperture by a retainer ring engaging said cup and said lower face of said support member, said left-hand threaded aperture being at the lower end of said cup;

said spring is a coil disposed in said cup and tapering inwardly and downwardly from a portion resting on and supported by an upper surface of said flange to a portion supporting a downwardly facing shoulder on said fastener;

said left-hand thread on said fastener being provided on a knob having a sleeve received on a downwardly projecting stem of said fastener and extending upwardly therefrom and abutting said shoulder, with a second fastener affixing said knob and sleeve on said stem.

4. The combination of claim 3 wherein:

said mounting member includes a spacer block concentric with the threaded aperture therein and arranged to abuttingly engage the said cup flange effecting the said tightening of said mounting member onto said support member while turning said threaded fastener counterclockwise.

References Cited

UNITED STATES PATENTS

| | | | |
|---|---|---|---|
| 2,289,514 | 7/1942 | Mastney et al. | 248—20 |
| 3,059,882 | 10/1962 | Staar | 248—25 X |
| 3,063,664 | 11/1962 | Vazzano | 248—20 |
| 3,198,324 | 8/1965 | Kallenbach et al. | 248—20 X |

ROY D. FRAZIER, *Primary Examiner.*

CHANCELLOR E. HARRIS, *Examiner.*

F. DOMOTOR, *Assistant Examiner.*